United States Patent
Sung (10) Patent No.: US 11,021,132 B2
(45) Date of Patent: Jun. 1, 2021

(54) REAR OCCUPANT PROTECTION APPARATUS AND METHOD OF CONTROLLING THE SAME

(71) Applicants: HYUNDAI MOTOR COMPANY, Seoul (KR); KIA MOTORS CORPORATION, Seoul (KR)

(72) Inventor: Yu Kyoung Sung, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/777,269

(22) Filed: Jan. 30, 2020

(65) Prior Publication Data
US 2021/0129791 A1    May 6, 2021

(30) Foreign Application Priority Data
Nov. 1, 2019   (KR) .................. 10-2019-0138700

(51) Int. Cl.
   *B60R 22/48*     (2006.01)
   *B60R 21/015*     (2006.01)
   *B60R 21/01*     (2006.01)

(52) U.S. Cl.
CPC .......... *B60R 22/48* (2013.01); *B60R 21/0155* (2014.10); *B60R 2021/01272* (2013.01); *B60R 2022/4841* (2013.01); *B60R 2300/301* (2013.01)

(58) Field of Classification Search
CPC ............. B60R 22/48; B60R 21/0155; B60R 2300/301; B60R 2022/4841; B60R 2021/01272
See application file for complete search history.

(56) References Cited

U.S. PATENT DOCUMENTS

| 6,422,595 | B1 * | 7/2002 | Breed ................ | B60N 2/002 |
| | | | | 280/735 |
| 6,992,571 | B2 * | 1/2006 | Ota .................... | B60R 22/48 |
| | | | | 340/407.1 |

(Continued)

FOREIGN PATENT DOCUMENTS

| EP | 1925506 A1 | 5/2008 |
| WO | 2002/008023 A2 | 1/2002 |
| WO | 2003/089277 A1 | 10/2003 |

OTHER PUBLICATIONS

European Search Report for EP Application No. 20154583.7, dated Aug. 13, 2020.

*Primary Examiner* — Daryl C Pope
(74) *Attorney, Agent, or Firm* — McDonnell Boehnen Hulbert & Berghoff LLP (57) ABSTRACT

Disclosed are a rear occupant protection apparatus and a control method thereof for controlling a seat belt, or an airbag, based on the state of a rear occupant and a vehicle driving environment to safely protect the rear occupant. The rear occupant protection apparatus includes a first monitoring unit configured to monitor a state of a rear occupant, a second monitoring unit configured to monitor a surrounding situation of a subject vehicle, and a controller configured to control the first and second monitoring units, wherein the controller controls the first and second monitors units to monitor the state of the rear occupant and the surrounding situation of the subject vehicle when the rear occupant wears a seat belt, and controls the seat belt seat belt worn by the rear occupant based on at least one of the state of the rear occupant or the surrounding situation of the subject vehicle.

16 Claims, 7 Drawing Sheets

(56) References Cited

U.S. PATENT DOCUMENTS

| | | |
|---|---|---|
| 9,878,689 B1 | 1/2018 | Jimenez et al. |
| 10,391,972 B1 * | 8/2019 | Chengalva .............. B60R 22/48 |
| 2008/0195261 A1 * | 8/2008 | Breed .................. B60N 2/0232 |
| | | 701/2 |
| 2013/0214919 A1 * | 8/2013 | Bassali .................. B60R 22/48 |
| | | 340/457.1 |
| 2014/0152823 A1 | 6/2014 | Breed |
| 2018/0244174 A1 * | 8/2018 | Tan .......................... B60N 2/22 |
| 2020/0155054 A1 * | 5/2020 | Slater .................. A61B 5/7282 |

* cited by examiner

REAR OCCUPANT PROTECTION APPARATUS AND METHOD OF CONTROLLING THE SAME

CROSS REFERENCE TO RELATED APPLICATION

This application claims the benefit of Korean Patent Application No. 10-2019-0138700, filed on Nov. 1, 2019, which is hereby incorporated by reference as if fully set forth herein.

BACKGROUND

Field

The present disclosure relates to a rear occupant protection apparatus, and more particularly, to a rear occupant protection apparatus and a method of controlling the same for controlling a seat belt, an airbag, and the like based on the state of a rear occupant and a vehicle traveling environment to safely protect the rear occupant.

Discussion of the Related Art

Recently, according to regulations for enhancing vehicle rear seat safety, a rear occupant of a vehicle is required to wear a seat belt, and a seat belt reminder (SBR) indicating whether a passenger wears a seat belt has been applied according to recent regulations.

As such, regulations whereby rear occupants are required to wear seat belts have been enacted because the safety of front occupants as well as the safety of rear occupants is affected.

However, in the case of vehicular front seats including a driver's seat and a front passenger seat, a function of controlling a seat belt in conjunction with an advanced driver assistance system (ADAS) is installed, and a driver also directly checks the safety of a seat belt, but in the case of vehicular rear seats, the frequency with which seat belts are worn is low, and the driver has more difficulty checking the safety of seat belts and whether rear occupants are wearing seat belts compared with the vehicular front seats, and thus the degree of danger of injury to the rear occupants is inevitably very high.

When a child sits a vehicle rear seat, they may loosely wear a seat belt due to excessive movement, and thus there is a problem in that they are always exposed to the danger of an accident.

Accordingly, there is the need for a rear occupant protection apparatus for the safety of a rear occupant by autonomously controlling a seat belt, an air bag, and the like based on the state of the rear occupant and the environment around the vehicle.

SUMMARY

An object of the present disclosure is to provide a rear occupant protection apparatus and a method of controlling the same for monitoring the state of a rear occupant and a surrounding situation of a subject vehicle, and automatically control a seat belt worn by the rear occupant based on at least one of the state of the rear occupant or the surrounding situation of the subject vehicle to safely protect the rear occupant.

The technical problems solved by the embodiments are not limited to the above technical problems and other technical problems which are not described herein will become apparent to those skilled in the art from the following description.

To achieve these objects and other advantages and in accordance with the purpose of the disclosure, as embodied and broadly described herein, a rear occupant protection apparatus includes a first monitoring unit configured to monitor a state of a rear occupant, a second monitoring unit configured to monitor a surrounding situation of a subject vehicle, and a controller configured to control the first and second monitoring units, wherein the controller controls the first and second monitors units to monitor the state of the rear occupant and the surrounding situation of the subject vehicle when the rear occupant wears a seat belt, and controls the seat belt seat belt worn by the rear occupant based on at least one of the state of the rear occupant or the surrounding situation of the subject vehicle.

According to another embodiment, a method of controlling a rear occupant protection apparatus includes checking whether a rear occupant rides in a vehicle, checking whether the rear occupant wears a seat belt when the rear occupant rides in the vehicle, acquiring state information of the rear occupant when the rear occupant wears the seat belt, checking whether the rear occupant sleeps based on the state information of the rear occupant, determining whether the position of the rear occupant exceeds a preset reference distance when the rear occupant sleeps, and pulling the seat belt worn by the rear occupant when the position of the rear occupant exceeds the preset reference distance.

According to another embodiment, a method of controlling a rear occupant protection apparatus includes checking whether a rear occupant rides in a vehicle, checking whether the rear occupant wears a seat belt when the rear occupant rides in the vehicle, determining whether a surrounding situation of a subject vehicle is a warning situation when the rear occupant wears the seat belt, vibrating the seat belt worn by the rear occupant when the surrounding situation of the subject vehicle is the warning situation, determining whether the surrounding situation of the subject vehicle is a dangerous situation, and pulling the seat belt worn by the rear occupant when the surrounding situation of the subject vehicle is the dangerous situation.

According to another embodiment, a method of controlling a rear occupant protection apparatus includes checking whether a rear occupant rides in a vehicle, checking whether the rear occupant wears a seat belt when the rear occupant rides in the vehicle, checking whether a current situation corresponds to a situation in which an airbag is deployed due to a vehicle crash when the rear occupant wears the seat belt, determining whether a position of the rear occupant deviates from a maximum unfolding region of the airbag when the current situation corresponds to the situation in which the airbag is deployed, and pulling the seat belt worn by the rear occupant when the position of the rear occupant deviates from the maximum unfolding region of the airbag.

According to another embodiment, a computer-readable recording medium has recorded thereon a program for executing the method of controlling a rear occupant protection apparatus.

According to another embodiment, a vehicle includes a plurality of seat belts disposed at a rear seat, and a rear occupant protection apparatus configured to control pulling of the seat belt, wherein the rear occupant protection apparatus monitors a state of the rear occupant and a surrounding situation of a subject vehicle when a rear occupant wears the seat belt, and controls pulling of the seat belt worn by the rear occupant based on at least one of the state of the rear occupant or the surrounding situation of the subject vehicle.

BRIEF DESCRIPTION OF THE FIGURES

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Exemplary embodiments of the present disclosure are described in detail so as for those of ordinary skill in the art to easily implement the present disclosure with reference to the accompanying drawings. However, the present disclosure may be implemented in various different forms and is not limited to these embodiments. To clearly describe the present disclosure, a part without concerning to the description is omitted in the drawings, and like reference numerals in the specification denote like elements.

Throughout the specification, one of ordinary skill would understand terms "include", "comprise", and "have" to be interpreted by default as inclusive or open rather than exclusive or closed unless expressly defined to the contrary. Further, terms such as "unit", "module", etc. disclosed in the specification mean units for processing at least one function or operation, which may be implemented by hardware, software, or a combination thereof.

Throughout the specification, when a certain part "includes" a certain component, this indicates that the part may further include another component instead of excluding another component unless there is no different disclosure. The same reference numbers will be used throughout the drawings to refer to the same parts.

Hereinafter, a rear occupant protection apparatus and a method of controlling the same applicable to embodiments of the present disclosure will be described in detail with reference to FIGS. 1 to 10.

Figure 1:
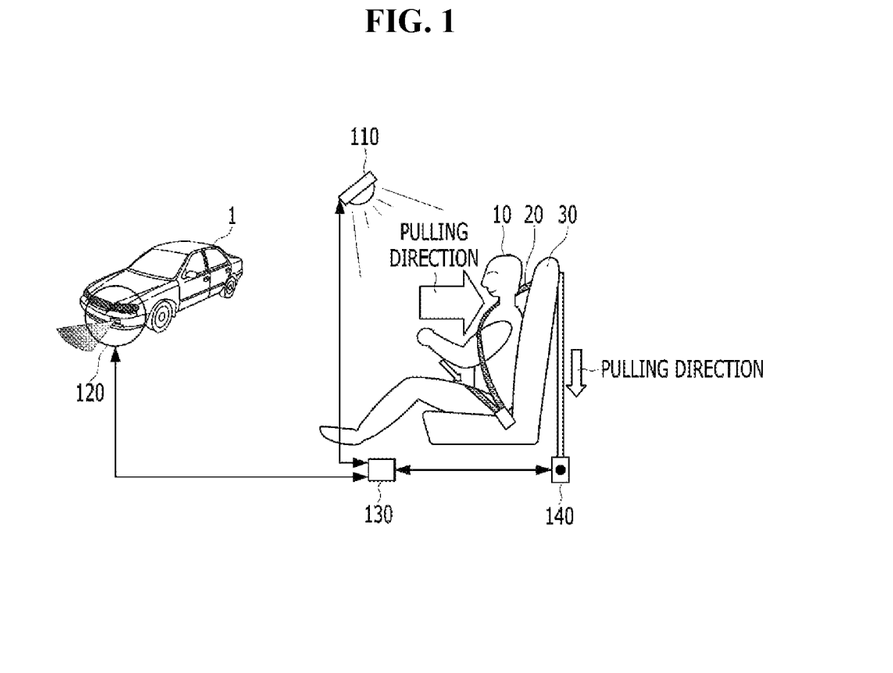
FIG. 1 is a diagram for explanation of a vehicle including a rear occupant protection apparatus according to an embodiment of the present disclosure.

FIG. 1 is a diagram for explanation of a vehicle including a rear occupant protection apparatus according to an embodiment of the present disclosure.

As shown in FIG. 1, the vehicle may include a plurality of seat belts 20 disposed at a rear seat 30, and the rear occupant protection apparatus for controlling pulling of the seat belt 20.

Here, the rear occupant protection apparatus may monitor the state of a rear occupant 10 and a surrounding situation of a subject vehicle 1 when the rear occupant 10 wears the seat belt 20, and may control pulling of the seat belt 20 worn by the rear occupant 10 based on at least one of the state of the rear occupant or the surrounding situation of the subject vehicle 1.

For example, the rear occupant protection apparatus may include a first monitoring unit 110 for monitoring the state of the rear occupant 10, a second monitoring unit 120 for monitoring the surrounding situation of the subject vehicle 1, a seat belt driver 140 for pulling the seat belt 20 according to a control signal of a controller 130, and the controller 130 for controlling the first and second monitoring units 110 and 120 and the seat belt driver 140.

Here, the first monitoring unit 110 may include, but is not limited to, a first sensor for sensing the presence and position of the rear occupant 10, a second sensor for sensing whether the rear occupant 10 wears the seat belt 20, and a third sensor for sensing the state of a body of the rear occupant 10.

The second monitoring unit 120 may include, but is not limited to, a radar for sensing a region around a subject vehicle and a camera for photographing the region around the subject vehicle.

Then, the controller 130 may control the first and second monitoring units 110 and 120 to monitor the state of the rear occupant 10 and the surrounding situation of the subject vehicle 1 when the rear occupant 10 wears the seat belt 20, and may control the seat belt 20 worn by the rear occupant 10 based on at least one of the state of the rear occupant 10 or the surrounding situation of the subject vehicle 1.

For example, when controlling the seat belt 20, the controller 130 may receive state information of the rear occupant 10 from the first monitoring unit 110, may determine whether the rear occupant 10 sleeps based on the state information of the rear occupant 10, and may control the seat belt 20 worn by the rear occupant 10 based on the position of the rear occupant 10 when the rear occupant 10 sleeps.

Here, the state information of the rear occupant 10 may include, but is not limited to, heartbeat pattern information of the rear occupant 10.

When controlling the seat belt 20 worn by the rear occupant 10, the controller 130 may receive position information of the rear occupant 10 from the first monitoring unit 110 when the rear occupant 10 sleeps, may determine whether the position of the rear occupant 10 exceeds a preset reference distance based on the position information of the rear occupant 10, and may control the seat belt 20 worn by the rear occupant 10 to be pulled when the position of the rear occupant 10 exceeds the preset reference distance.

Here, the preset reference distance may be a distance to an imaginary plane parallel to the rear-seat back from a rear-seat back when the imaginary plane is positioned in front of the rear-seat back.

When determining whether the position of the rear occupant 10 exceeds the preset reference distance, the controller 130 may determine that the position of the rear occupant 10 exceeds the preset reference distance when a measuring distance between an upper body of the rear occupant 10 and the rear-seat back is greater than a reference distance.

When determining whether the position of the rear occupant 10 exceeds the preset reference distance, the controller 130 may receive the state information of the rear occupant 10 from the first monitoring unit 110 and may determine whether the rear occupant 10 sleeps when the position of the rear occupant 10 does not exceed the preset reference distance.

When controlling the seat belt 20 to be pulled, the controller 130 may control the seat belt driver 140 to pull the seat belt 20, may receive the position information of the rear occupant 10 from the first monitoring unit 110 when the seat belt 20 is pulled, may determine whether the position of the rear occupant 10 falls within the reference distance based on the position information of the rear occupant 10, and may terminate control of the seat belt 20 when the position of the rear occupant 10 falls within the reference distance.

In another example, when controlling the seat belt 20, the controller 130 may receive information on the surrounding situation of the subject vehicle 1 from the second monitoring unit 120, may determine a warning situation or a dangerous situation based on the surrounding situation of the subject vehicle 1, and may control the seat belt 20 worn by the rear occupant 10 when the surrounding situation is a warning situation or a dangerous situation.

When controlling the seat belt 20 worn by the rear occupant 10, the controller 130 may control vibration of the seat belt 20 worn by the rear occupant 10 when the surrounding situation of the subject vehicle 1 is a warning situation, and may control the seat belt 20 worn by the rear occupant 10 when the surrounding situation of the subject vehicle 1 is a dangerous situation.

In another example, when controlling the seat belt 20, the controller 130 may check whether a current situation corresponds to a situation in which an airbag is deployed due to a vehicle crash, and may control the seat belt 20 worn by the rear occupant 10 based on the position of the rear occupant 10 when the current situation corresponds to a situation in which the airbag is deployed.

Here, when controlling the seat belt 20 worn by the rear occupant 10, the controller 130 may receive the position information of the rear occupant 10 from the first monitoring unit 110 when the current situation corresponds to a situation in which the airbag is deployed, may determine whether the position of the rear occupant 10 deviates from a maximum unfolding region of an airbag based on the position information of the rear occupant 10, and may control the seat belt 20 worn by the rear occupant 10 to be weakly pulled when the position of the rear occupant 10 deviates from the maximum unfolding region of an airbag.

In this case, when controlling the seat belt 20 worn by the rear occupant 10 to be weakly pulled, the controller 130 may perform control to lower a pulling degree of the seat belt 20 compared with a reference value.

When determining whether the position of the rear occupant 10 deviates from the maximum unfolding region of an airbag, the controller 130 may check whether a tension of the seat belt 20 is lower than a reference tension when the position of the rear occupant 10 does not deviate from the maximum unfolding region of an airbag, may control the seat belt 20 worn by the rear occupant 10 to be strongly pulled when the tension of the seat belt 20 is lower than the reference tension, and may control the airbag to lower airbag deployment strength compared with the reference strength.

Here, when controlling the seat belt 20 worn by the rear occupant 10 to be strongly pulled, the controller 130 may increase the pulling degree of the seat belt 20 compared with the reference value.

When checking whether the tension of the seat belt 20 is lower than the reference tension, the controller 130 may control the seat belt 20 worn by the rear occupant 10 to be strongly pulled when the tension of the seat belt 20 is not lower than the reference tension, and may control the airbag to be deployed with the reference strength as airbag deployment strength.

Here, when controlling the seat belt 20 worn by the rear occupant 10 to be strongly pulled, the controller 130 may control the seat belt 20 to be pulled by a higher pulling degree than the reference value.

As such, according to the present disclosure, the state of a rear occupant and a surrounding situation of a subject vehicle may be monitored and a seat belt worn by the rear occupant may be automatically controlled based on at least one of the state of the rear occupant or the surrounding situation of the subject vehicle, thereby safely protecting the rear occupant.

That is, according to the present disclosure, the state of wearing the seat belt of the rear occupant may be determined, and the rear occupant may be maintained in a safe posture when a dangerous situation such as crash occurs around a vehicle, thereby enhancing safety.

In addition, according to the present disclosure, the position of the rear occupant when a side airbag is deployed may be determined in order to adjust airbag deployment strength, and thus the rear occupant may be prevented from being injured due to airbag deployment.

Figure 2:
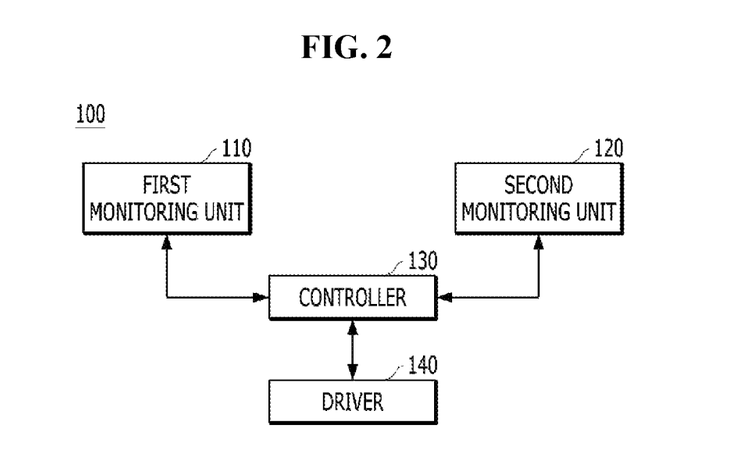
FIG. 2 is a block diagram for explanation of the configuration of a rear occupant protection apparatus according to an embodiment of the present disclosure.
Figure 3:
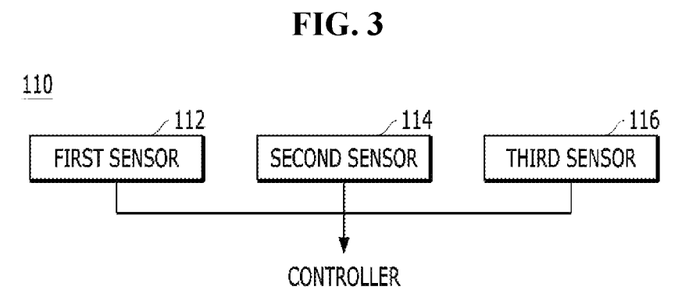
FIG. 3 is a block diagram for explanation of the configuration of a first monitoring unit of FIG. 2.
Figure 4:
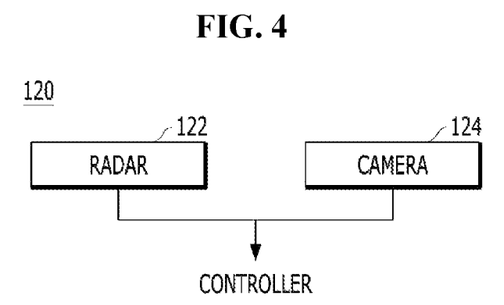
FIG. 4 is a block diagram for explanation of the configuration of a second monitoring unit of FIG. 2.

FIG. 2 is a block diagram for explanation of the configuration of a rear occupant protection apparatus according to an embodiment of the present disclosure. FIG. 3 is a block diagram for explanation of the configuration of the first monitoring unit of FIG. 2. FIG. 4 is a block diagram for explanation of the configuration of the second monitoring unit of FIG. 2.

As shown in FIG. 2, a rear occupant protection apparatus 100 according to the present disclosure may include the first monitoring unit 110 for monitoring the state of a rear occupant, the second monitoring unit 120 for monitoring a surrounding situation of a subject vehicle, the seat belt driver 140 for pulling a seat belt according to a control signal of the controller 130, and the controller 130 for controlling the first and second monitoring units 110 and 120 and the seat belt driver 140.

As shown in FIG. 3, the first monitoring unit 110 may include a first sensor 112 for sensing the presence and position of the rear occupant, a second sensor 114 for sensing whether the rear occupant wears a seat belt, and a third sensor 116 for sensing the state of the body of the rear occupant.

For example, the first sensor 112 may include, but is not limited to, a motion sensor for sensing motion of the rear occupant.

Here, the first sensor 112 may be disposed in a vehicle indoor space around a rear seat.

The third sensor 116 may include, but is not limited to, a photoplethysmogram (PPG) for sensing a heartbeat of the rear occupant.

Here, the third sensor 116 may be installed at a vehicle rear seat.

As shown in FIG. 4, the second monitoring unit 120 may include, but is not limited to, a radar 122 for sensing a region around the subject vehicle and a camera 124 for photographing the region around the subject vehicle.

Here, the radar may include a front radar for sensing a forward side of the subject vehicle and a side radar for sensing a lateral side of the subject vehicle.

The camera may include a front camera for photographing the forward side of the subject vehicle, and a side camera for photographing the lateral side of the subject vehicle.

When controlling the first monitoring unit 110, the controller 130 may control the first monitoring unit 110 to monitor whether the rear occupant rides in the subject vehicle when the subject vehicle travels.

Here, the controller 130 may control an alarm unit to provide an alarm indicating that the seat belt is not being worn when the rear occupant does not wear the seat belt.

For example, when controlling the seat belt, the controller 130 may receive state information of the rear occupant from the first monitoring unit 110, may determine whether the rear occupant sleeps based on the state information of the rear occupant, and may control the seat belt worn by the rear occupant based on the position of the rear occupant when the rear occupant sleeps.

Here, the state information of the rear occupant may include, but is not limited to, heartbeat pattern information of the rear occupant.

When controlling the seat belt worn by the rear occupant, the controller 130 may receive the position information of the rear occupant from the first monitoring unit 110 when the rear occupant sleeps, may determine whether the position of the rear occupant exceeds the preset reference distance based on the position information of the rear occupant, and may control the seat belt worn by the rear occupant to be pulled when the position of the rear occupant exceeds the preset reference distance.

Here, the preset reference distance may be a distance from a rear-seat back to an imaginary plane parallel to the rear-seat back when the imaginary plane is positioned in front of the rear-seat back.

If necessary, the preset reference distance may be changed depending on the physical state of the rear occupant.

For example, with regard to the preset reference distance, a reference distance when the physical state of the rear occupant corresponds to an adult may be greater than a reference distance when the physical state of the rear occupant corresponds to a child.

When determining whether the position of the rear occupant exceeds the preset reference distance, the controller 130 may determine that the position of the rear occupant exceeds the preset reference distance when a measuring distance between an upper body of the rear occupant 10 and the rear-seat back is greater than a reference distance.

When determining whether the position of the rear occupant 10 exceeds the preset reference distance, the controller 130 may receive the state information of the rear occupant 10 from the first monitoring unit 110 and may determine whether the rear occupant 10 sleeps when the position of the rear occupant 10 does not exceed the preset reference distance.

When controlling the seat belt to be pulled, the controller 130 may control the seat belt driver 140 to pull the seat belt, may receive the position information of the rear occupant from the first monitoring unit 110 when the seat belt is pulled, may determine whether the position of the rear occupant falls within the reference distance based on the position information of the rear occupant, and may terminate control of the seat belt when the position of the rear occupant falls within the reference distance.

In another example, when controlling the seat belt, the controller 130 may receive information on the surrounding situation of the subject vehicle from the second monitoring unit 120, may determine a warning situation or a dangerous situation based on the surrounding situation of the subject vehicle, and may control the seat belt worn by the rear occupant when the surrounding situation is a warning situation or a dangerous situation.

Here, when controlling the seat belt by the rear occupant, the controller 130 may control vibration of the seat belt worn by the rear occupant when the surrounding situation of the subject vehicle is a warning situation, and may control the seat belt worn by the rear occupant when the surrounding situation of the subject vehicle is a dangerous situation.

If necessary, when controlling the seat belt, the controller 130 may receive information on the surrounding situation of the subject vehicle from the second monitoring unit 120, may determine a warning situation based on the surrounding situation of the subject vehicle, may primarily control the seat belt worn by the rear occupant when the surrounding situation is a warning situation, may receive the information on the surrounding situation of the subject vehicle from the second monitoring unit 120 when primarily controlling the seat belt, may determine a dangerous situation based on the surrounding situation of the subject vehicle, and may secondarily control the seat belt worn by the rear occupant when the surrounding situation is a dangerous situation.

Here, when primarily controlling the seat belt worn by the rear occupant, the controller 130 may control vibration of the seat belt worn by the rear occupant, and when secondarily controlling the seat belt worn by the rear occupant, the controller 130 may perform control to pull the seat belt worn by the rear occupant.

In another example, when controlling the seat belt, the controller 130 may check whether the current situation corresponds to a situation in which an airbag is deployed due to a vehicle crash, and may control the seat belt worn by the rear occupant based on the position of the rear occupant when the current situation corresponds to a situation in which the airbag is deployed.

Here, when controlling the seat belt worn by the rear occupant, the controller 130 may receive the position information of the rear occupant from the first monitoring unit 110 when the current situation corresponds to a situation in which the airbag is deployed, may determine whether the position of the rear occupant deviates from a maximum unfolding region of an airbag based on the position information of the rear occupant, and may control the seat belt worn by the rear occupant to be weakly pulled when the position of the rear occupant deviates from the maximum unfolding region of an airbag.

The seat belt is controlled to be weakly pulled because the rear occupant is capable of being prevented from being injured due to deployment of a side airbag when the position of the rear occupant deviates from the maximum unfolding region of an airbag, and thus the posture of the rear occupant may be safely and smoothly corrected.

In this case, when controlling the seat belt worn by the rear occupant to be weakly pulled, the controller 130 may lower the pulling degree of the seat belt compared with a reference value.

When determining whether the position of the rear occupant deviates from the maximum unfolding region of an airbag, the controller 130 may check whether the tension of the seat belt is lower than a reference tension when the position of the rear occupant does not deviate from the maximum unfolding region of an airbag, may control the seat belt worn by the rear occupant to be strongly pulled when the tension of the seat belt is lower than the reference tension, and may control the airbag to lower airbag deployment strength compared with the reference strength.

The tension of the seat belt is considered because the rear occupant may be injured due to deployment of a side airbag when the position of the rear occupant falls within the maximum unfolding region of an airbag, and thus the seat belt and the airbag are simultaneously controlled in consideration of the tension of the seat belt, thereby accurately and safely fixing a stable posture of the rear occupant.

Here, when performing control to strongly pull the seat belt worn by the rear occupant, the controller 130 may pull the seat belt by a higher pulling degree than the reference value.

When checking whether the tension of the seat belt is lower than a reference tension, the controller 130 may strongly pull the seat belt worn by the rear occupant when the tension of the seat belt is not lower than the reference tension, and may control the airbag to be deployed with the reference strength as airbag deployment strength.

Here, when performing control to strongly pull the seat belt worn by the rear occupant, the controller 130 may control the seat belt to be pulled by a higher pulling degree than the reference value.

Figure 5:
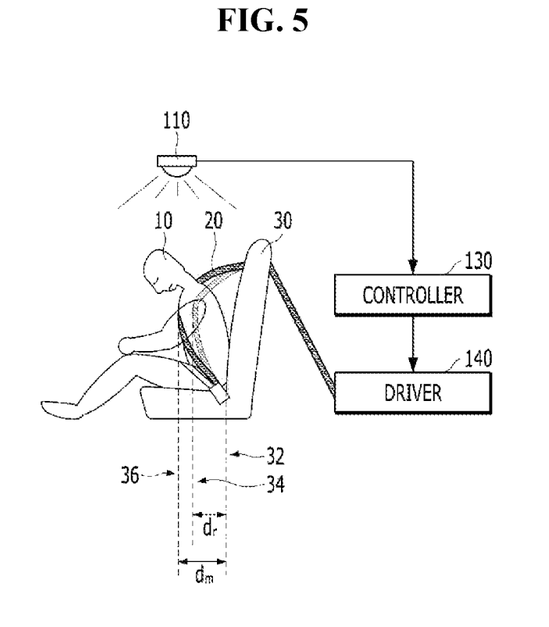
FIG. 5 is a diagram for explaining a method of controlling a rear occupant protection apparatus according to a first embodiment of the present disclosure.

FIG. 5 is a diagram for explaining a method of controlling a rear occupant protection apparatus according to a first embodiment of the present disclosure.

As shown in FIG. 5, the controller 130 according to the present disclosure may check whether the rear occupant 10 rides in a vehicle from the first monitoring unit 110, and may check whether the rear occupant wears the seat belt 20 when the rear occupant 10 rides in the vehicle.

The controller 130 may acquire state information of the rear occupant 10 from the first monitoring unit 110 when the rear occupant 10 wears the seat belt 20, and may determine whether the rear occupant 10 sleeps based on the state information of the rear occupant 10.

Here, the state information of the rear occupant 10 may include, but is not limited to, heartbeat pattern information of the rear occupant.

Then, the controller 130 may receive the position information of the rear occupant 10 from the first monitoring unit 110 when the rear occupant 10 sleeps, and may determine whether the position of the rear occupant 10 exceeds a preset reference distance $d_r$ (reference distance) based on the position information of the rear occupant 10.

Here, the preset reference distance $d_r$ may be a distance from a rear-seat back 32 to an imaginary plane 34 parallel to a rear-seat back 32 when the imaginary plane 34 is positioned in front of the rear-seat back 32.

If necessary, the preset reference distance $d_r$ may be changed depending on the physical state of the rear occupant 10.

For example, with regard to the preset reference distance $d_r$, a reference distance when the rear occupant 10 is an adult may be greater than a reference distance when the rear occupant 10 is a child.

Then, when the position of the rear occupant 10 exceeds the preset reference distance, the controller 130 may control the seat belt driver 140 to pull the seat belt 20 worn by the rear occupant 10.

Here, when determining whether the position of the rear occupant 10 exceeds the preset reference distance, the controller 130 may determine that the position of the rear occupant 10 exceeds the preset reference distance $d_r$ when a measuring distance $d_m$ between the rear-seat back 32 and an imaginary plane 36 on which the upper body of the rear occupant 10 is positioned is greater than the reference distance $d_r$.

When determining whether the position of the rear occupant 10 exceeds the preset reference distance, the controller 130 may receive state information of the rear occupant from the first monitoring unit 110 and may continuously determine whether the rear occupant sleeps when the position of the rear occupant 10 does not exceed the preset reference distance $d_r$.

When performing control to pull the seat belt 20, the controller 130 may control the seat belt driver 140 to pull the seat belt 20, may receive position information of the rear occupant 10 from the first monitoring unit 110 when the seat belt is pulled, may determine whether the position of the rear occupant 10 falls within the reference distance based on the position information of the rear occupant 10, and may terminate control of the seat belt 20 when the position of the rear occupant 10 falls within the reference distance.

Thus, according to the first embodiment of the present disclosure, even if a rear occupant loosely wears a seat belt due to sleep or the like, the seat belt may be automatically controlled to safely maintain the posture of the rear occupant.

Figure 6:
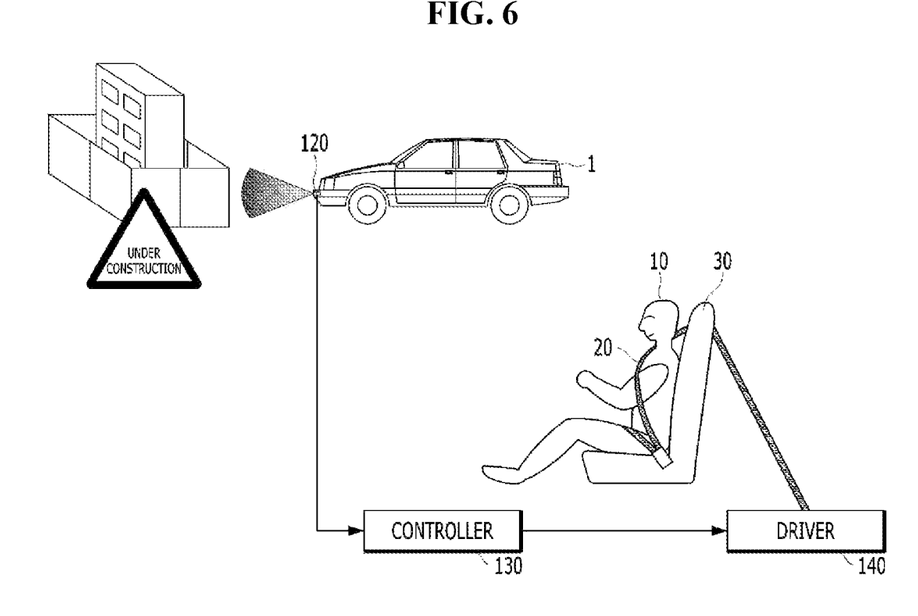
FIG. 6 is a diagram for explaining a method of controlling a rear occupant protection apparatus according to a second embodiment of the present disclosure.

FIG. 6 is a diagram for explaining a method of controlling a rear occupant protection apparatus according to a second embodiment of the present disclosure.

As shown in FIG. 6, the controller 130 according to the present disclosure may check whether the rear occupant 10 rides in a vehicle from a first monitoring unit and may check whether the rear occupant wears the seat belt 20 when the rear occupant 10 rides in the vehicle.

The controller 130 may receive information on a surrounding situation of the subject vehicle 1 from the second monitoring unit 120 when the rear occupant 10 wears the seat belt 20, and may determine a warning situation or a dangerous situation based on the surrounding situation of the subject vehicle 1.

Then, the controller 130 may control the seat belt driver 140 to vibrate the seat belt 20 worn by the rear occupant 10 when the surrounding situation of the subject vehicle 1 is a warning situation, and may control the seat belt driver 140 to pull the seat belt 20 worn by the rear occupant 10 when the surrounding situation of the subject vehicle 1 is a dangerous situation.

If necessary, the controller 130 may receive information on the surrounding situation of the subject vehicle 1 from the second monitoring unit 120, may determine a warning situation based on the surrounding situation of the subject vehicle, may primarily control the seat belt worn by the rear occupant 10 to vibrate when the surrounding situation is a warning situation, may receive information on the surrounding situation of the subject vehicle 1 from the second monitoring unit 120 when primarily controlling the seat belt 20, may determine a dangerous situation based on the surrounding situation of the subject vehicle 1, and may secondarily control the seat belt worn by the rear occupant 10 to be pulled when the surrounding situation is a dangerous situation.

Thus, according to the second embodiment of the present disclosure, when the surrounding situation of the subject vehicle is the warning or dangerous situation, vibration and pulling of the seat belt may be automatically controlled to safely maintain a posture of the rear occupant, thereby enhancing safety.

Figure 7A:
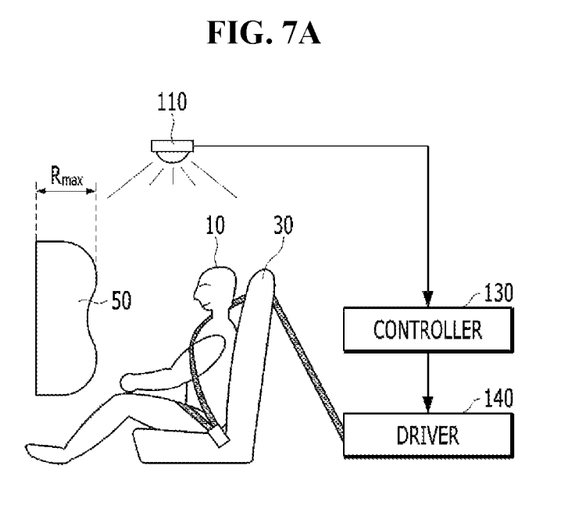
FIGS. 7A and 7B are diagrams for explaining a method of controlling a rear occupant protection apparatus according to a third embodiment of the present disclosure.
Figure 7B:
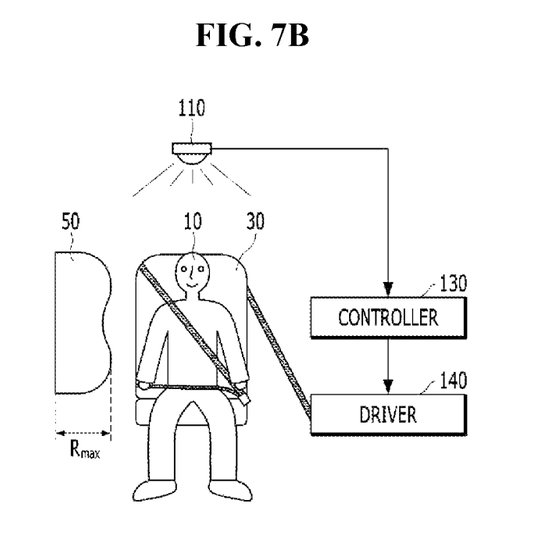

FIGS. 7A and 7B are diagrams for explaining a method of controlling a rear occupant protection apparatus according to a third embodiment of the present disclosure, in which FIG. 7A is a diagram showing a lateral side of a rear occupant and FIG. 7B is a diagram showing a front side of the rear occupant.

As shown in FIGS. 7A and 7B, the controller 130 according to the present disclosure may check whether the rear occupant 10 rides in a vehicle from the first monitoring unit 110, and may check whether the rear occupant 10 wears the seat belt 20 when the rear occupant 10 rides in the vehicle.

The controller 130 may check whether a current situation corresponds to a situation in which an airbag 50 is deployed due to a vehicle crash when the rear occupant 10 wears the seat belt 20, and may receive position information of the rear occupant 10 from the first monitoring unit 110 when the current situation corresponds to a situation in which the airbag 50 is deployed.

Then, the controller 130 may determine whether the position of the rear occupant 10 deviates from a maximum unfolding region $R_{max}$ of the airbag 50 based on position information of the rear occupant 10.

Then, when the position deviates from the maximum unfolding region $R_{max}$ of the airbag 50, the controller 130 may control the seat belt driver 140 to weakly pull the seat belt 20 worn by the rear occupant 10.

The seat belt 20 is controlled to be weakly pulled because the rear occupant 10 is capable of being prevented from being injured due to deployment of a front airbag shown in FIG. 7A or a side airbag shown in FIG. 7B when the position of the rear occupant 10 deviates from the maximum unfolding region $R_{max}$ of the airbag 50, and thus the posture of the rear occupant 10 may be safely and smoothly corrected.

In this case, when controlling the seat belt 20 worn by the rear occupant 10 to be weakly pulled, the controller 130 may lower a pulling degree of the seat belt compared with a reference value.

If necessary, the controller 130 may check whether the tension of the seat belt 20 is lower than a reference tension when the position of the rear occupant 10 does not deviate from the maximum unfolding region $R_{max}$ of the airbag 50, may control the seat belt 20 worn by the rear occupant 10 to be strongly pulled when the tension of the seat belt 20 is lower than the reference tension, and may control the airbag 50 to lower the airbag deployment strength compared with the reference strength.

The tension of the seat belt is considered because the rear occupant may be injured due to deployment of a front airbag or a side airbag when the position of the rear occupant falls within the maximum unfolding region $R_{max}$ of the airbag 50, and thus both the seat belt 20 and the airbag 50 are simultaneously controlled in consideration of the tension of the seat belt 20, thereby accurately and safely fixing a stable posture of the rear occupant 10.

Here, when controlling the seat belt 20 worn by the rear occupant 10 to be strongly pulled, the controller 130 may control the seat belt 20 to be pulled by a higher pulling degree than the reference value.

When checking whether the tension of the seat belt 20 is lower than the reference tension, the controller 130 may control the seat belt 20 worn by the rear occupant 10 to be strongly pulled when the tension of the seat belt 20 is not lower than the reference tension, and may control the airbag 50 to be deployed with the reference strength as airbag deployment strength.

Here, when controlling the seat belt 20 worn by the rear occupant 10 to be strongly pulled, the controller 130 may control the seat belt 20 to be pulled by a higher pulling degree than the reference value.

Thus, according to the third embodiment of the present disclosure, the position of the rear occupant when a front or side airbag is deployed may be determined, the airbag may be controlled to adjust an airbag deployment strength, the seat belt may be controlled to adjust the pulling strength of the seat belt in consideration of the tension of the seat belt, and thus the rear occupant may be prevented from being injured due to airbag deployment, thereby enhancing safety.

Figure 8:
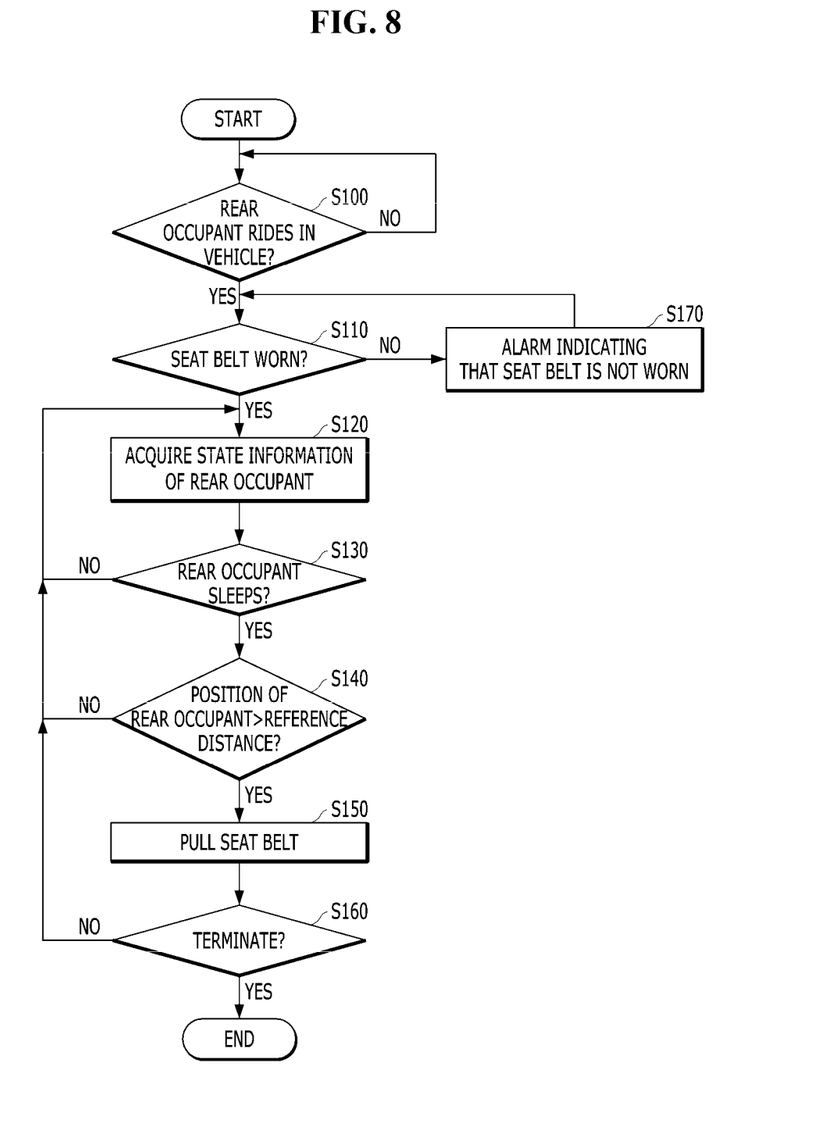
FIG. 8 is a flowchart for explaining a method of controlling the rear occupant protection apparatus according to the first embodiment of the present disclosure.

FIG. 8 is a flowchart for explaining a method of controlling the rear occupant protection apparatus according to the first embodiment of the present disclosure.

As shown in FIG. 8, a controller of the rear occupant protection apparatus may check whether a rear occupant rides in a vehicle (S100).

When a rear occupant rides in the vehicle, the controller may check whether the rear occupant wears a seat belt (S110).

Here, the controller may check whether the rear occupant rides in the vehicle when the subject vehicle begins to travel.

The controller may provide an alarm indicating that the seat belt is not being worn when the rear occupant does not wear the seat belt (S170).

Then, when the rear occupant wears the seat belt, the controller may acquire state information of the rear occupant (S120).

Here, the controller may acquire heartbeat pattern information of the rear occupant.

Then, the controller may check whether the rear occupant sleeps based on the state information of the rear occupant (S130).

When the rear occupant sleeps, the controller may determine whether the position of the rear occupant exceeds a preset reference distance (S140).

Here, the preset reference distance may be a distance from a rear-seat back to an imaginary plane parallel to the rear-seat back when the imaginary plane is positioned in front of the rear-seat back.

When the distance between the upper body of the rear occupant and the rear-seat back is greater than a reference distance, the controller may determine that the position of the rear occupant exceeds the preset reference distance.

Here, when the position of the rear occupant does not exceed the preset reference distance, the controller may acquire state information of the rear occupant and may repeatedly check whether the rear occupant sleeps.

Then, when the position of the rear occupant exceeds the preset reference distance, the controller may pull a seat belt worn by the rear occupant (S150).

Here, the controller may acquire position information of the rear occupant after pulling the seat belt, may determine whether the position of the rear occupant falls within the reference distance based on the position information of the rear occupant, and may terminate control of the seat belt when the position of the rear occupant falls within the reference distance.

The controller may check whether the subject vehicle terminates traveling (S160) and may terminate the method of controlling the rear occupant protection apparatus when the subject vehicle terminates traveling.

As such, according to the first embodiment of the present disclosure, even if a rear occupant loosely wears a seat belt due to sleep or the like, the seat belt may be automatically controlled to safely maintain a posture of the rear occupant.

Figure 9:
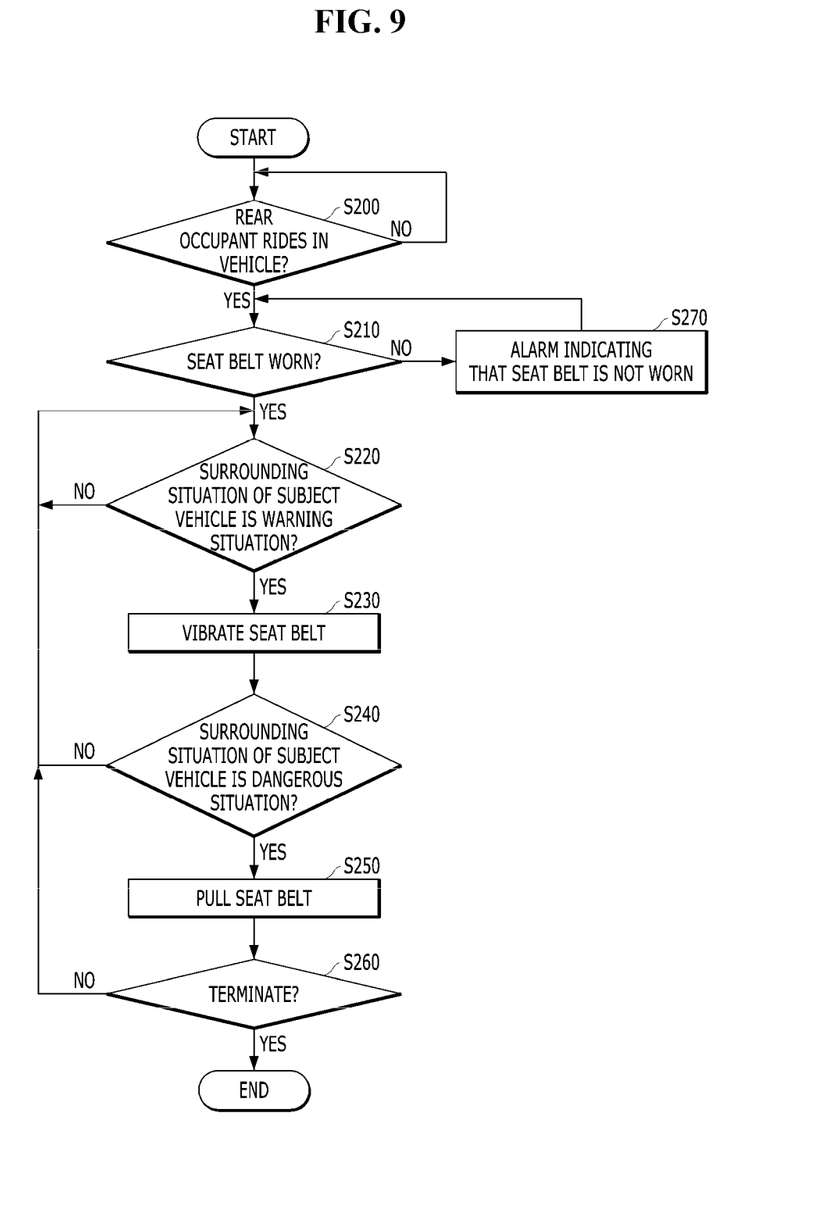
FIG. 9 is a flowchart for explaining a method of controlling the rear occupant protection apparatus according to the second embodiment of the present disclosure.

FIG. 9 is a flowchart for explaining a method of controlling the rear occupant protection apparatus according to the second embodiment of the present disclosure.

As shown in FIG. 9, a controller of the rear occupant protection apparatus may check whether a rear occupant rides in a vehicle (S200).

When a rear occupant rides in the vehicle, the controller may check whether the rear occupant wears a seat belt (S210).

Here, the controller may check whether the rear occupant rides in the vehicle when a subject vehicle begins to travel.

The controller may provide an alarm indicating that the seat belt is not being worn when the rear occupant does not wear the seat belt (S270).

Then, when the rear occupant wears the seat belt, the controller may check whether a surrounding situation of the subject vehicle is a warning situation (S220).

Then, when the surrounding situation of the subject vehicle is a warning situation, the controller may vibrate the seat belt worn by the rear occupant (S230).

The controller may determine whether the surrounding situation of the subject vehicle is a dangerous situation (S240).

Then, when the surrounding situation of the subject vehicle is a dangerous situation, the controller may pull the seat belt worn by the rear occupant (S250).

Then, the controller may check whether the subject vehicle terminates traveling (S260) and may terminate the method of controlling the rear occupant protection apparatus when the subject vehicle terminates traveling.

As such, according to the second embodiment of the present disclosure, when the surrounding situation of the subject vehicle is a warning or dangerous situation, vibration and pulling of the seat belt may be automatically controlled to safely maintain the posture of the rear occupant, thereby enhancing safety.

Figure 10:
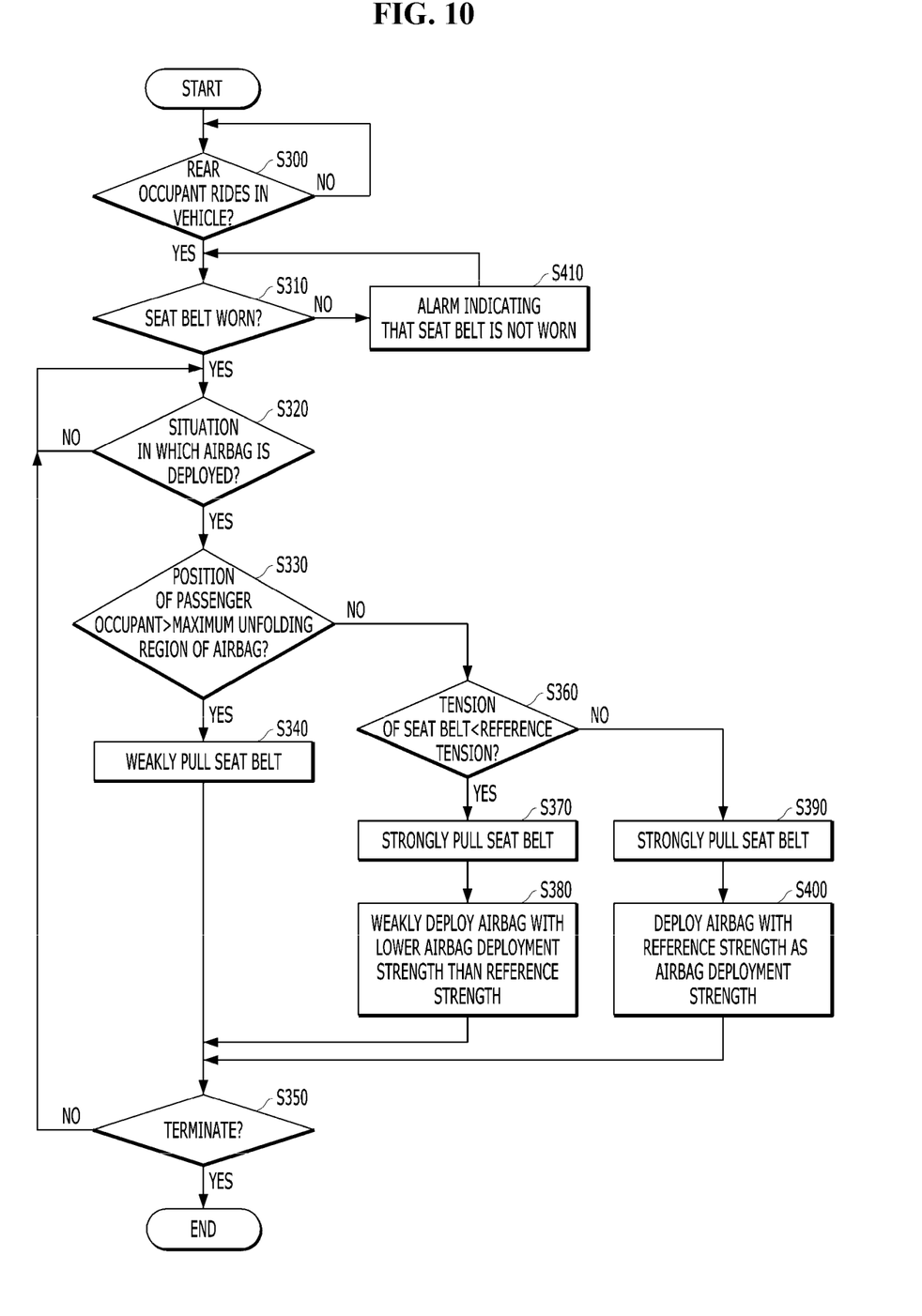
FIG. 10 is a flowchart for explaining a method of controlling the rear occupant protection apparatus according to the third embodiment of the present disclosure.

FIG. 10 is a flowchart for explaining a method of controlling the rear occupant protection apparatus according to the third embodiment of the present disclosure.

As shown in FIG. 10, a controller of the rear occupant protection apparatus may check whether a rear occupant rides in a vehicle (S300).

When a rear occupant rides in the vehicle, the controller may check whether the rear occupant wears a seat belt (S310).

Here, the controller may check whether the rear occupant rides in the vehicle when a subject vehicle begins to travel.

The controller may provide an alarm indicating that the seat belt is not being worn when the rear occupant does not wear the seat belt (S410).

Then, when the rear occupant wears the seat belt, the controller may check whether a current situation corresponds to a situation in which an airbag is deployed due to a vehicle crash (S320).

Then, when the current situation corresponds to a situation in which the airbag is deployed, the controller may determine whether the position of the rear occupant deviates from a maximum unfolding region of an airbag (S330).

When the position of the rear occupant deviates from the maximum unfolding region of an airbag, the controller may weakly pull the seat belt worn by the rear occupant (S340).

Here, the controller may perform control to lower the pulling degree of the seat belt compared with a reference value.

If necessary, the controller may check whether the tension of the seat belt is lower than a reference tension when the position of the rear occupant does not deviate from the maximum unfolding region of an airbag (S360).

When the tension of the seat belt is lower than the reference tension, the controller may strongly pull the seat belt worn by the rear occupant (S370).

Here, the controller may perform control to increase the pulling degree of the seat belt compared with the reference value.

Then, the controller may deploy the airbag with lower airbag deployment strength than the reference strength (S380).

In another case, when checking whether the tension of the seat belt is lower than the reference tension, the controller may strongly pull the seat belt worn by the rear occupant when the tension of the seat belt is not lower than the reference tension (S390).

Here, the controller may pull the seat belt with a higher pulling degree than a reference value.

Then, the controller may deploy the airbag with reference strength as airbag deployment strength (S400).

Then, the controller may check whether the subject vehicle terminates traveling (S350) and may terminate the method of controlling the rear occupant protection apparatus when the subject vehicle terminates traveling.

As such, according to the third embodiment of the present disclosure, the position of the rear occupant when a front or side airbag is deployed may be determined, the airbag may be controlled to adjust airbag deployment strength, the seat belt may be controlled to adjust a pulling strength of the seat belt in consideration of the tension of the seat belt, and thus the rear occupant may be prevented from being injured due to airbag deployment, thereby enhancing safety.

The present disclosure relates to a computer-readable recording medium having recorded thereon a program for executing a method of controlling a rear occupant protection apparatus and may perform procedures provided by the method of controlling the rear occupant protection apparatus according to the embodiments of the present disclosure.

A vehicle according to an embodiment of the present disclosure may include a plurality of seat belts disposed at a rear seat and a rear occupant protection apparatus for controlling pulling of the seat belts, and the rear occupant protection apparatus may monitor the state of a rear occupant and a surrounding situation of a subject vehicle when the rear occupant wears the seat belt, and may control pulling of the seat belt worn by the rear occupant based on at least one of the state of the rear occupant or the surrounding situation of the subject vehicle.

As such, according to the present disclosure, the state of a rear occupant and a surrounding situation of a subject vehicle may be monitored and a seat belt worn by the rear occupant may be automatically controlled based on at least one of the state of the rear occupant or the surrounding situation of the subject vehicle, thereby safely protecting the rear occupant.

That is, according to the present disclosure, the state of wearing the seat belt by the rear occupant may be determined, and the rear occupant may be maintained in a safe posture when a dangerous situation such as crash occurs around a vehicle, thereby enhancing safety.

In addition, according to the present disclosure, the position of the rear occupant when a side airbag is deployed may be determined in order to adjust airbag deployment strength, and thus the rear occupant may be prevented from being injured due to airbag deployment.

In the rear occupant protection apparatus and the method of controlling the same related to at least one embodiment of the present disclosure as configured above, the state of a rear occupant and a surrounding situation of a subject vehicle may be monitored and a seat belt worn by the rear occupant may be automatically controlled based on at least one of the state of the rear occupant or the surrounding situation of the subject vehicle, thereby safely protecting the rear occupant.

That is, according to the present disclosure, the state of wearing the seat belt of the rear occupant may be determined and the rear occupant may be maintained in a safe posture when a dangerous situation such as a crash occurs around a vehicle, thereby enhancing safety.

In addition, according to the present disclosure, the position of the rear occupant when a side airbag is deployed may be determined in order to adjust airbag deployment strength, and thus the rear occupant may be prevented from being injured due to airbag deployment.

It will be appreciated by persons skilled in the art that that the effects that could be achieved with the present disclosure are not limited to what has been particularly described hereinabove and other advantages of the present disclosure will be more clearly understood from the detailed description.

The aforementioned present disclosure can also be embodied as computer readable code stored on a computer readable recording medium. The computer readable recording medium is any data storage device that can store data which can thereafter be read by a computer. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, carrier waves (e.g., transmission via the Internet), etc.

It will be apparent to those skilled in the art that various modifications and variations can be made in the present disclosure without departing from the spirit or scope of the embodiments. Thus, it is intended that the present disclosure cover the modifications and variations of the embodiment provided they come within the scope of the appended claims and their equivalents.

The invention claimed is:

1. A rear occupant protection apparatus comprising:
a first monitoring unit configured to monitor a state of a rear occupant;
a second monitoring unit configured to monitor a surrounding situation of a subject vehicle; and
a controller configured to control the first and second monitoring units,
wherein the controller controls the first and second monitoring units to monitor the state of the rear occupant and the surrounding situation of the subject vehicle when the rear occupant wears a seat belt, and controls the seat belt worn by the rear occupant based on at least one of the state of the rear occupant or the surrounding situation of the subject vehicle;
wherein, when controlling the seat belt, the controller receives state information of the rear occupant from the first monitoring unit, determines whether the rear occupant sleeps based on the state information of the rear occupant, and controls the seat belt worn by the rear occupant based on a position of the rear occupant when the rear occupant sleeps;
wherein, when controlling the seat belt worn by the rear occupant, the controller receives position information of the rear occupant from the first monitoring unit when the rear occupant sleeps, determines whether the position of the rear occupant exceeds a preset reference distance based on the position information of the rear occupant, and controls the seat belt worn by the rear occupant to be pulled when the position of the rear occupant exceeds the preset reference distance;
wherein the preset reference distance is a distance from a rear-seat back to an imaginary plane parallel to the rear-seat back when the imaginary plane is positioned in front of the rear-seat back; and
wherein the controller determines that the position of the rear occupant exceeds the preset reference distance when a measuring distance between an upper body of the rear occupant and the rear-seat is greater than the present reference distance.

2. The rear occupant protection apparatus of claim 1, wherein the first monitoring unit includes:
a first sensor configured to sense presence of the rear occupant and a position thereof;
a second sensor configured to sense whether the rear occupant wears the seat belt; and
a third sensor configured to sense a state of a body of the rear occupant.

3. The rear occupant protection apparatus of claim 1, wherein the second monitoring unit includes:
a radar configured to sense a region around the subject vehicle; and
a camera configured to photograph the region around the subject vehicle.

4. The rear occupant protection apparatus of claim 1, wherein, when controlling the first monitoring unit, the controller controls the first monitoring unit to monitor whether the rear occupant rides in a vehicle when the subject vehicle travels.

5. The rear occupant protection apparatus of claim 1, wherein the controller controls the alarm unit to provide an alarm indicating that the seat belt is not worn when the rear occupant does not wear the seat belt.

6. The rear occupant protection apparatus of claim 1, wherein, when controlling the seat belt, the controller receives information on a surrounding situation of the subject vehicle from the second monitoring unit, determines a warning situation or a dangerous situation based on the surrounding situation of the subject vehicle, and controls the seat belt worn by the rear occupant when the surrounding situation is the warning situation or the dangerous situation.

7. The rear occupant protection apparatus of claim 6, wherein, when controlling the seat belt worn by the rear occupant, the controller controls vibration of the seat belt worn by the rear occupant when the surrounding situation of the subject vehicle is the warning situation, and controls the seat belt worn by the rear occupant to be pulled when the surrounding situation of the subject vehicle is the dangerous situation.

8. The rear occupant protection apparatus of claim 1, wherein, when controlling the seat belt, the controller checks whether a current situation corresponds to a situation in which an airbag is deployed due to a vehicle crash, and controls the seat belt worn by the rear occupant based on a position of the rear occupant when the current situation corresponds to the situation in which the airbag is deployed.

9. The rear occupant protection apparatus of claim 8, wherein, when controlling the seat belt worn by the rear occupant, the controller receives position information of the rear occupant from the first monitoring unit when the current situation corresponds to the situation in which the airbag is deployed, determines whether the position of the rear occupant deviates from a maximum unfolding region of the airbag based on the position information of the rear occupant, and controls the seat belt worn by the rear occupant to be weakly pulled when the position of the rear occupant deviates from the maximum unfolding region of the airbag.

10. The rear occupant protection apparatus of claim 9, wherein, when determining whether the position of the rear occupant deviates from the maximum unfolding region of the airbag, the controller checks whether a tension of the seat belt is lower than a reference tension when the position of the rear occupant does not deviate from the maximum unfolding region of the airbag, controls the seat belt worn by the rear occupant to be strongly pulled when the tension of the seat belt is lower than the reference tension, and controls the airbag to be deployed with an airbag deployment strength that is lower than a reference strength.

11. The rear occupant protection apparatus of claim 10, wherein, when checking whether the tension of the seat belt is lower than the reference tension, the controller controls the seat belt worn by the rear occupant to be strongly pulled when the tension of the seat belt is not lower than the reference tension, and controls the airbag to be deployed with the reference strength as the airbag deployment strength.

12. A method of controlling a rear occupant protection apparatus, the method comprising:
  checking whether a rear occupant rides in a vehicle;
  checking whether the rear occupant wears a seat belt when the rear occupant rides in the vehicle;
  acquiring a state information of the rear occupant and a surrounding situation information of the subject vehicle when the rear occupant wears the seat belt; and
  controlling the seat belt worn by the rear occupant based on at least one of the state information of the rear occupant or the surrounding situation information of the subject vehicle;
  wherein the controlling the seat belt worn by the rear occupant includes:
    checking whether the rear occupant sleeps based on the state information of the rear occupant;
    determining whether the position of the rear occupant exceeds a preset reference distance when the rear occupant sleeps; and
    pulling the seat belt worn by the rear occupant when the position of the rear occupant exceeds the preset reference distance;
  wherein, the preset reference distance is a distance from a rear-seat back to an imaginary plane parallel to the rear-seat back when the imaginary plane is positioned in front of the rear-seat back; and
  wherein the controller determines that the position of the rear occupant exceeds the preset reference distance when a measuring distance between an upper body of the rear occupant and the rear-seat is greater than the present reference distance.

13. The method of claim 12, wherein the controlling the seat belt worn by the rear occupant includes:
  vibrating the seat belt worn by the rear occupant when the surrounding situation information of the subject vehicle is the warning situation;
  determining whether the surrounding situation information of the subject vehicle is a dangerous situation; and
  pulling the seat belt worn by the rear occupant when the surrounding situation information of the subject vehicle is the dangerous situation.

14. The method of claim 12, wherein the controlling the seat belt worn by the rear occupant includes:
  checking whether a current situation corresponds to a situation in which an airbag is deployed due to a vehicle crash when the rear occupant wears the seat belt;
  determining whether a position of the rear occupant deviates from a maximum unfolding region of the airbag when the current situation corresponds to the situation in which the airbag is deployed; and
  pulling the seat belt worn by the rear occupant when the position of the rear occupant deviates from the maximum unfolding region of the airbag.

15. The method of claim 14, wherein the determining whether the position of the rear occupant deviates from the maximum unfolding region of the airbag includes:
  checking whether a tension of the seat belt is lower than a reference tension when the position of the rear occupant does not deviate from the maximum unfolding region of the airbag;
  pulling the seat belt worn by the rear occupant when the tension of the seat belt is lower than the reference tension; and
  deploying the airbag with an airbag deployment strength that is lower than a reference strength.

16. The method of claim 15, wherein the checking whether the tension of the seat belt is lower than the reference tension includes:
  pulling the seat belt worn by the rear occupant when the tension of the seat belt is not lower than the reference tension; and
  deploying the airbag with the reference strength as the airbag deployment strength.

* * * * *